United States Patent
Moloney

(10) Patent No.: US 10,746,155 B2
(45) Date of Patent: Aug. 18, 2020

(54) WATER TURBINE SUPPORT STRUCTURE

(71) Applicant: REPETITIVE ENERGY COMPANY LIMITED, Penarth (GB)

(72) Inventor: Frank Moloney, Penarth (GB)

(73) Assignee: REPETITIVE ENERGY COMPANY LIMITED (GB)

( * ) Notice: Subject to any disclaimer, the term of this patent is extended or adjusted under 35 U.S.C. 154(b) by 143 days.

(21) Appl. No.: 15/522,582

(22) PCT Filed: Oct. 27, 2015

(86) PCT No.: PCT/GB2015/000296
§ 371 (c)(1),
(2) Date: Apr. 27, 2017

(87) PCT Pub. No.: WO2016/066985
PCT Pub. Date: May 6, 2016

(65) Prior Publication Data
US 2018/0291868 A1   Oct. 11, 2018

(30) Foreign Application Priority Data
Oct. 27, 2014 (GB) .................................. 1419099.5

(51) Int. Cl.
*F03B 17/06* (2006.01)
*F03B 13/26* (2006.01)
(Continued)

(52) U.S. Cl.
CPC ............ *F03B 17/063* (2013.01); *F03B 13/10* (2013.01); *F03B 13/264* (2013.01); *H02K 5/124* (2013.01);
(Continued)

(58) Field of Classification Search
CPC ...... F03B 13/10; F03B 13/264; F03B 17/063; H02K 5/124; H02K 7/003; H02K 7/1823;
(Continued)

(56) References Cited

U.S. PATENT DOCUMENTS 1,740,595 A    12/1929   Hohlt
4,482,829 A *  11/1984   Tardieu .................... H02K 5/15
                                                          310/105
(Continued)

FOREIGN PATENT DOCUMENTS

KR    20130096060    8/2013

*Primary Examiner* — Charles Reid, Jr.
(74) *Attorney, Agent, or Firm* — Andrew D. Dorisio; King & Schickli, PLLC

(57) ABSTRACT

A water flow turbine arrangement for capturing energy from water flows is provided. The arrangement includes: a base member (212); a generally open support structure (210) mounted to the base and upstanding therefrom, the support structure including plural legs (216) joined by a cross brace at or adjacent their upper ends; an electrical generator (230) mounted to the base; and shaft mounted turbine blades (220) mounted for rotation generally within the space occupied by the legs about a turbine axis. The turbine shaft (222) is supported at its upper end by the cross brace and is coupled to the generator at its lower end by a magnetic torque transmitting coupling, allowing complete fluid sealing of the generator's housing.

13 Claims, 7 Drawing Sheets

(51) Int. Cl.
*F03B 13/10* (2006.01)
*H02K 5/124* (2006.01)
*H02K 7/00* (2006.01)
*H02K 7/18* (2006.01)

(52) U.S. Cl.
CPC .......... *H02K 7/003* (2013.01); *H02K 7/1823* (2013.01); *F05B 2210/404* (2013.01); *F05B 2220/706* (2013.01); *F05B 2220/7068* (2013.01); *F05B 2240/10* (2013.01); *F05B 2240/12* (2013.01); *F05B 2240/211* (2013.01); *F05B 2240/214* (2013.01); *F05B 2240/24* (2013.01); *F05B 2240/244* (2013.01); *F05B 2240/30* (2013.01); *F05B 2240/50* (2013.01); *F05B 2240/91* (2013.01); *F05B 2260/404* (2013.01); *Y02E 10/28* (2013.01)

(58) Field of Classification Search
CPC .......... F05B 2210/404; F05B 2220/706; F05B 2220/7068; F05B 2240/10; F05B 2240/12; F05B 2240/211; F05B 2240/214; F05B 2240/24; F05B 2240/244; F05B 2240/30; F05B 2240/50; F05B 2240/91; F05B 2260/404; Y02E 10/28
USPC .................................................. 290/43, 54
See application file for complete search history.

(56) References Cited

U.S. PATENT DOCUMENTS

| | | | |
|---|---|---|---|
| 5,917,259 A * | 6/1999 | Stridsberg | H02K 7/003 310/75 A |
| 2009/0191057 A1 | 7/2009 | Knutson | |
| 2009/0261595 A1* | 10/2009 | Poo | F03D 3/02 290/55 |
| 2009/0289459 A1 | 11/2009 | Chung | |
| 2010/0032952 A1* | 2/2010 | Hatch | F01D 1/20 290/54 |
| 2012/0189448 A1 | 7/2012 | Jaquier et al. | |

* cited by examiner

WATER TURBINE SUPPORT STRUCTURE

FIELD OF THE INVENTION

The present invention relates to turbines for harnessing the kinetic energy in water flows, particularly but not exclusively, vertical axis turbines.

BACKGROUND OF THE INVENTION

Numerous attempts have been made to harness water flow as a source of energy. Horizontal axis water mills were one of the first means of powering industrial machinery. Undershot and overshot wheels have been employed for centuries. Historic screw type turbines have been invented also. Such early designs lacked efficiency and reliability.

Reaction turbines, such as a Pelton wheels, which employ a jet or jets of water have been used to improve efficiency. Impulse wheels, such as Francis and Kaplan wheels have also been produced, with further improved efficiency. These impulse wheels generally have an enclosed bladed turbine set of various geometries. However these designs rely on complex sets of turbine blades and complementary curved/scrolled housings, which are expensive to manufacture, and not easy to repair because they are enclosed. Where it is impracticable to capture water flows in pipes and the like, for example in tidal sea flows, such reaction and impulse type designs are impracticable. Francis rotors and Kaplan rotors are examples of turbine rotors that rotate about an axis that is aligned with the overall direction of the fluid flowing through them. Savonius rotors and Darrieus rotors are examples of turbine rotors that rotate about an axis that is transverse with the overall direction of the fluid flowing through them, but which do not necessarily require enclosure. Embodiments of this invention relate to these latter turbines, which are also called vertical axis turbines or cross axis turbines.

Where tidal flows are harnessed, it is quite possible that for some of the time, only a part of the turbine will be submerged, and the flow will reverse with the rise and ebb of the tide. So enclosed turbines will be of no use, unless a significant superstructure is constructed to channel water flow at most stages of a tide. One example of such a superstructure is disclosed in GB2495443 which shows a vertical/cross axis turbine arrangement combined with a barrage and water channels.

Various other vertical axis tidal flow turbines have been considered, without the need for such a superstructure but these known designs are weak and/or complicated. Such designs are disclosed, for example in CA2849054; KR20130096060; and WO2013030582.

Where turbines are intended for commercial use in remote or inaccessible areas, such as deep under water or in strong tidal flows, then low cost, ease of installation, and reliability, are the most important factors. Efficiency is important but is secondary. So a water channelling superstructure is too expensive in most cases, unless they have another use, such as a water dam or a vehicle bridge. Enclosed turbines are also expensive and difficult to repair, particularly under water.

The inventors have realised that a simple and strong, self-contained design can mitigate some of the drawbacks of previous designs, and propose herein, embodiments which address those drawbacks.

The invention provides a water flow turbine arrangement for capturing energy from the water flow according to the independent claims herein having preferred features defined by dependent claims.

The invention extends to any combination of features disclosed herein, whether or not such a combination is mentioned explicitly herein. Further, where two or more features are mentioned in combination, it is intended that such features may be claimed separately without extending the scope of the invention.

BRIEF DESCRIPTION OF THE DRAWINGS

The invention can be put into effect in numerous ways, illustrative embodiments of which are described below with reference to the drawings, wherein.

DETAILED DESCRIPTION OF THE INVENTION

Figure 1:
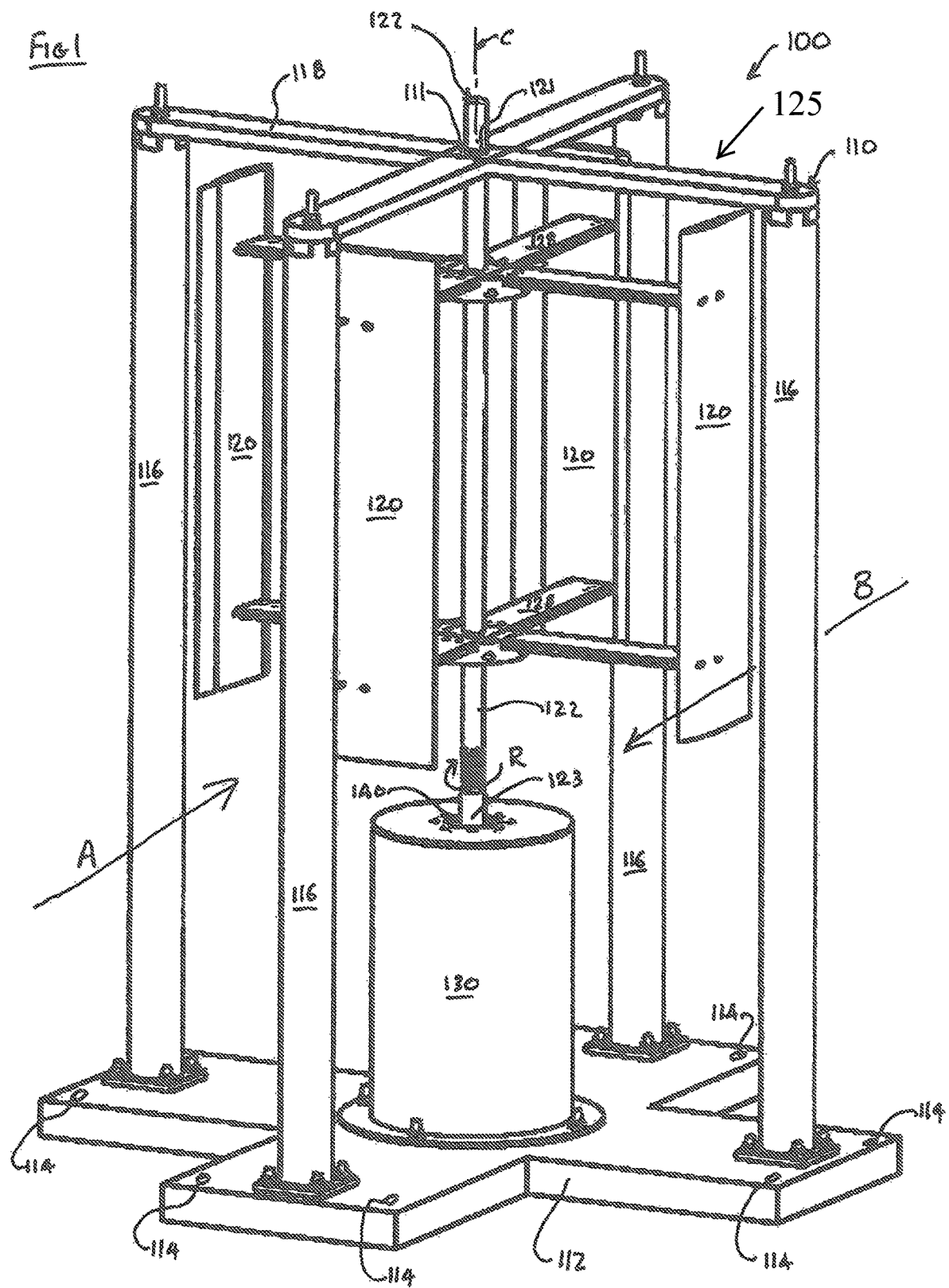
FIG. 1 shows schematically a pictorial view of one embodiment of a vertical axis turbine.

The invention, together with its objects and the advantages thereof, may be understood better by reference to the following description taken in conjunction with the accompanying drawings, in which like reference numerals identify like elements in the Figures.

Referring to FIG. 1, an embodiment of a cross axis turbine 100 is shown schematically, which includes a fixed superstructure 110, a set of blades 125 mounted on a drive shaft 122 and a rotary machine 130, in this case in the form of an electrical generator, coupled to the drive shaft 122, and fixed to a base 112 of the superstructure 110. This turbine allows generation of electric power from water flows in any approach direction, for example tidal flow and ebb in the directions A and B respectively.

In more detail, the base 112 of the superstructure 110 is manufactured from cast concrete and steel which is preferably heavy enough to hold down the whole turbine 100 to the bed of the water volume in strong water currents. The base 112 is provided with anchor points 114 also, should the water currents at the deployment area merit securing of the turbine to the bed. The superstructure further includes four support legs 116 which are rigidly secured to, and are upstanding from, the base 112. At their upper ends, the legs are further rigidified by, a demountable cross brace 118, having a central top bearing 111 within which an upper end 121 of the turbine's drive shaft 122 rotates in use.

The blade set 125 comprises four equally spaced blades 120 connected adjacent their upper and lower regions to the drive shaft 122 by respective spokes 128. The blades 120 are straight along their length and parallel to each other which allows a simple low cost construction. The blades each have lift type profiles, which pull the blade around into the water flow, in the direction of arrow R, and offer low resistance to rotation when moving with the flow.

At the lower end 123 of the drive shaft 122, is a coupling 140 for transmitting torque to the generator 130 as the shaft is rotated by the blades 120 in a water flow. This coupling 140 is shown in FIG. 2.

Figure 2:
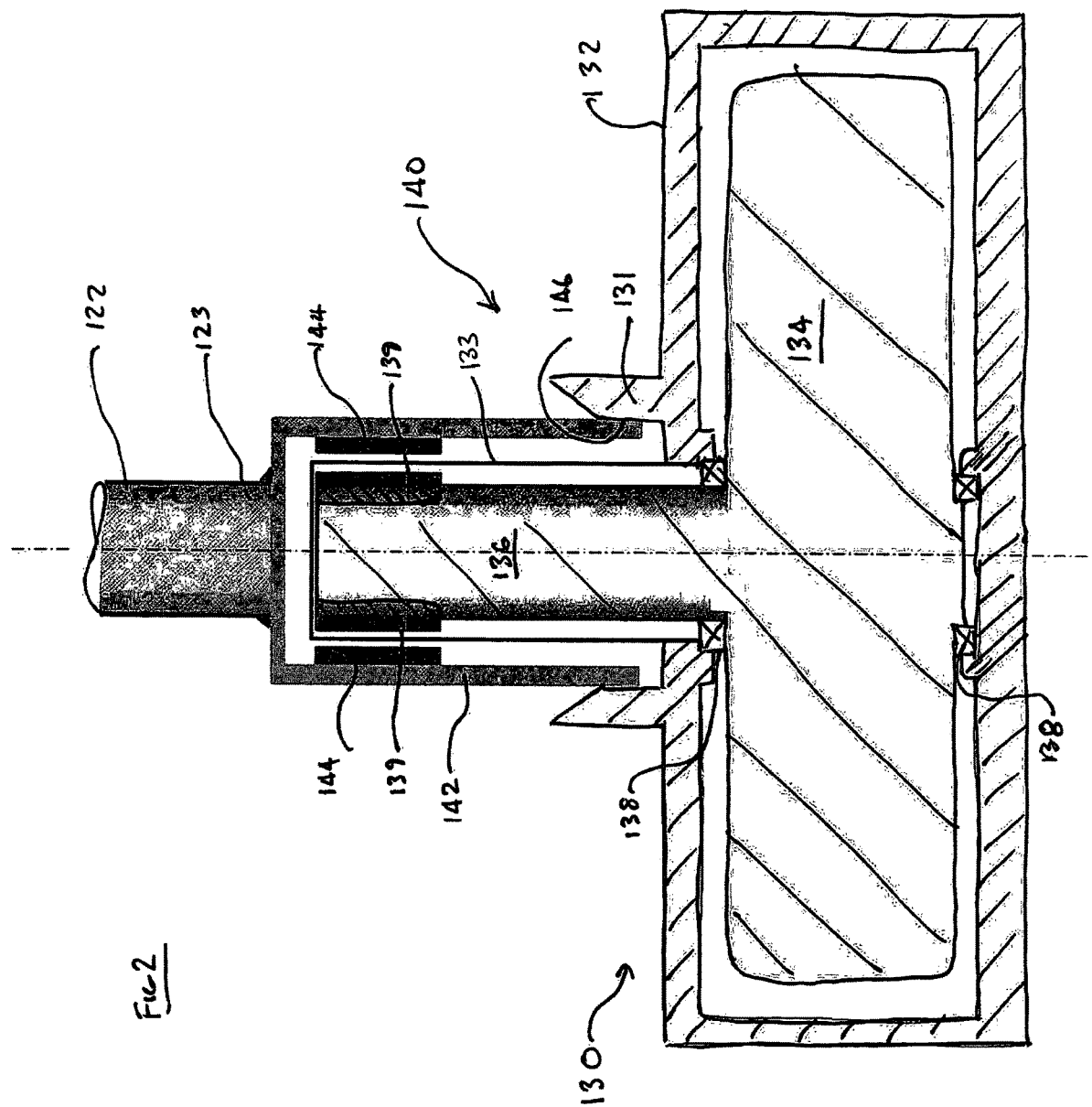
FIG. 2 shows a detail of the turbine shown in FIG. 1.

FIG. 2 shows a cross section through the coupling 140 between the drive shaft 122 and the generator 130. The coupling 140 includes a bell housing 142 which is attached to the lower end of the shaft 123 for rotation therewith. An inner face of the bell housing includes a cylindrical array of powerful permanent drive magnets 144. The lower end 146 of the bell housing 142 fits snugly in an open mouthed receiving socket 131 in an upper face of the generator's housing 132, such 10 that the housing acts as a bearing support to keep the generator 130 and shaft 122 aligned by acting as a rotary bearing. Other bearing arrangements are possible to achieve the same alignment. The generator 130 has a rotor 134, driven by a driven shaft 136 all supported on bearings 138, and all hermetically sealed within the generator housing 132. The top of the driven shaft 136 further includes a cylindrical array of powerful permanent driven magnets 139 which are positioned in a complementary attracted position to the drive magnets 144 inside the bell housing 142, such that rotation of the shaft 122 causes rotation of the driven shaft 134 in a torque transmitting manner, as a result of magnetic attraction between the magnets 144 and 139. The housing 132 includes a thin nonmagnetic stainless steel sleeve 133, fitted between the complementary magnets, over the driven shaft 134, forming part of the housing, such that the hermetic sealing of the housing 132 is maintained. Since the generator is hermetically sealed, then there is no possibility of water ingress into the generator housing. The permanent magnet parts and their mountings which form part of the coupling 140 and available commercially for example from KTR Couplings Ltd under the trade name Minex.

This coupling arrangement allows upper parts of the superstructure 110, i.e. the cross brace 118 shown in FIG. 1 to be disengaged from lower parts of the superstructure 110, i.e. the legs 116, and to be lifted together with the shaft 122 and blade assembly 125, and to leave the generator 130 in place fixed to the base 112, for maintenance purposes. The generator can then be removed if required. Each can be replaced with easy reassembly.

Figure 3:
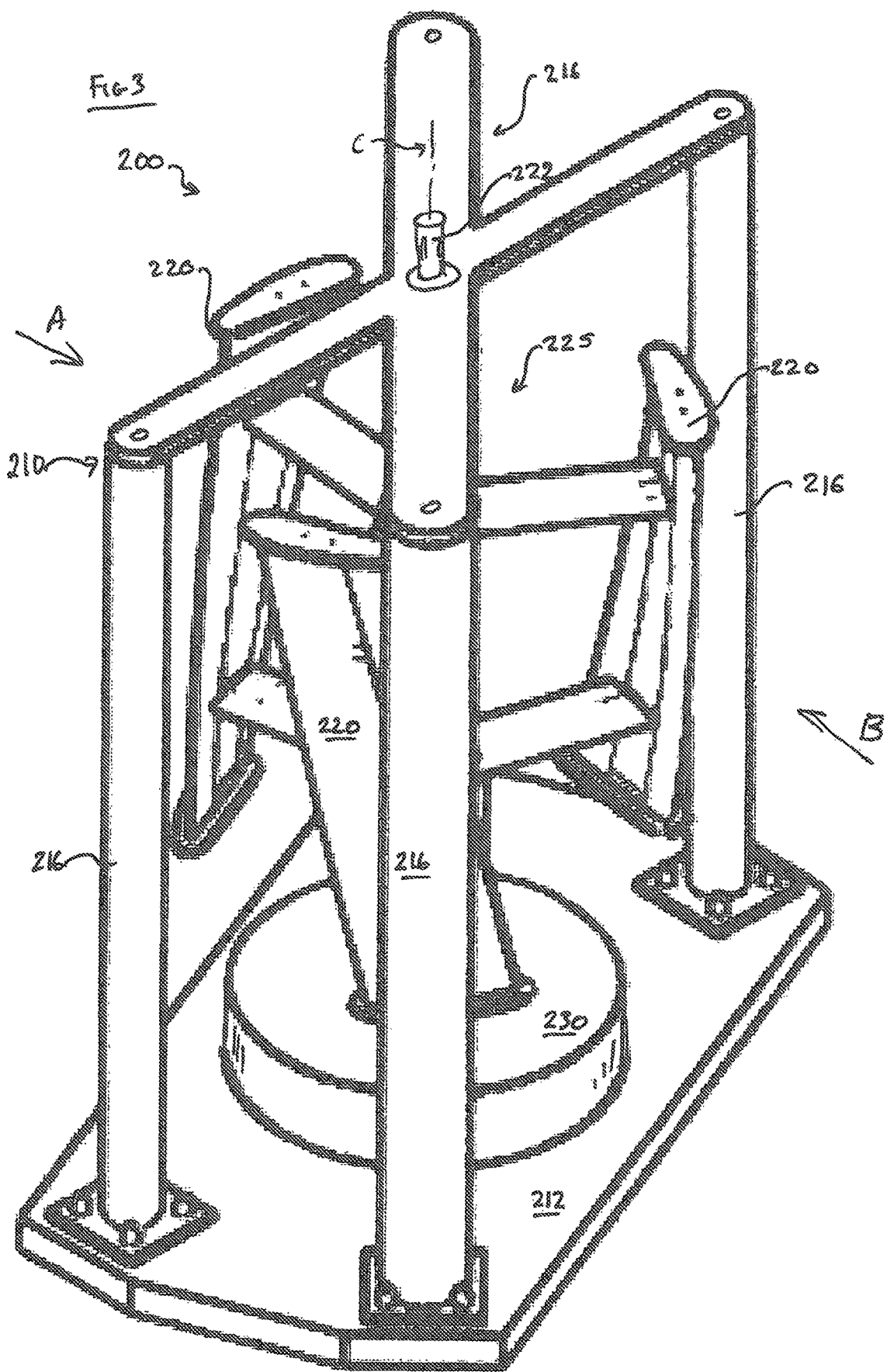
FIG. 3 shows a pictorial view of a second embodiment of a vertical axis turbine.

FIG. 3 shows a further embodiment of a turbine 200 which is similar in construction to the turbine 100 described above. Parts which are similar in construction in the embodiment shown in FIG. 1 and in the embodiment shown in FIG. 3 have the same last two digits in their reference numbers and so are not fully detailed below.

The embodiment shown in FIG. 3 includes a generally open support structure 210 mounted to a base 212 and upstanding therefrom, and the structure 210 includes a plurality of legs 216. Base 212 and legs 216 have broadly the same construction and function as the base 112 and legs 116 described above, but the legs are not equidistantly spaced in this embodiment. Rather, the legs are laid out such that they occupy a generally rectangular plan, and so are positioned to avoid perturbing water flow in the A and B directions, which are the most likely flow directions which may be encountered when tidal flows are reversed by 180 degrees. The legs 216 are joined by a cross brace 218 having a central top bearing 211.

Further, blades 220 of a blade set 225 are helically formed around a shaft 222, to provide less vibration than the straight blades shown in FIG. 1 when they rotate. The shaft 222 has an upper end 221 and a lower end 223. The upper end 221 of the shaft 222 rotates in use within the central top bearing 211 of the cross brace 218. In view of their helical formation, and greater efficiency, only three blades are required in this embodiment. Of note also is the proportions of the rotary machine-generator 230, which is flatter than the generator 130 illustrated in FIG. 1 and thereby provides a more compact turbine 200.

Figure 4:
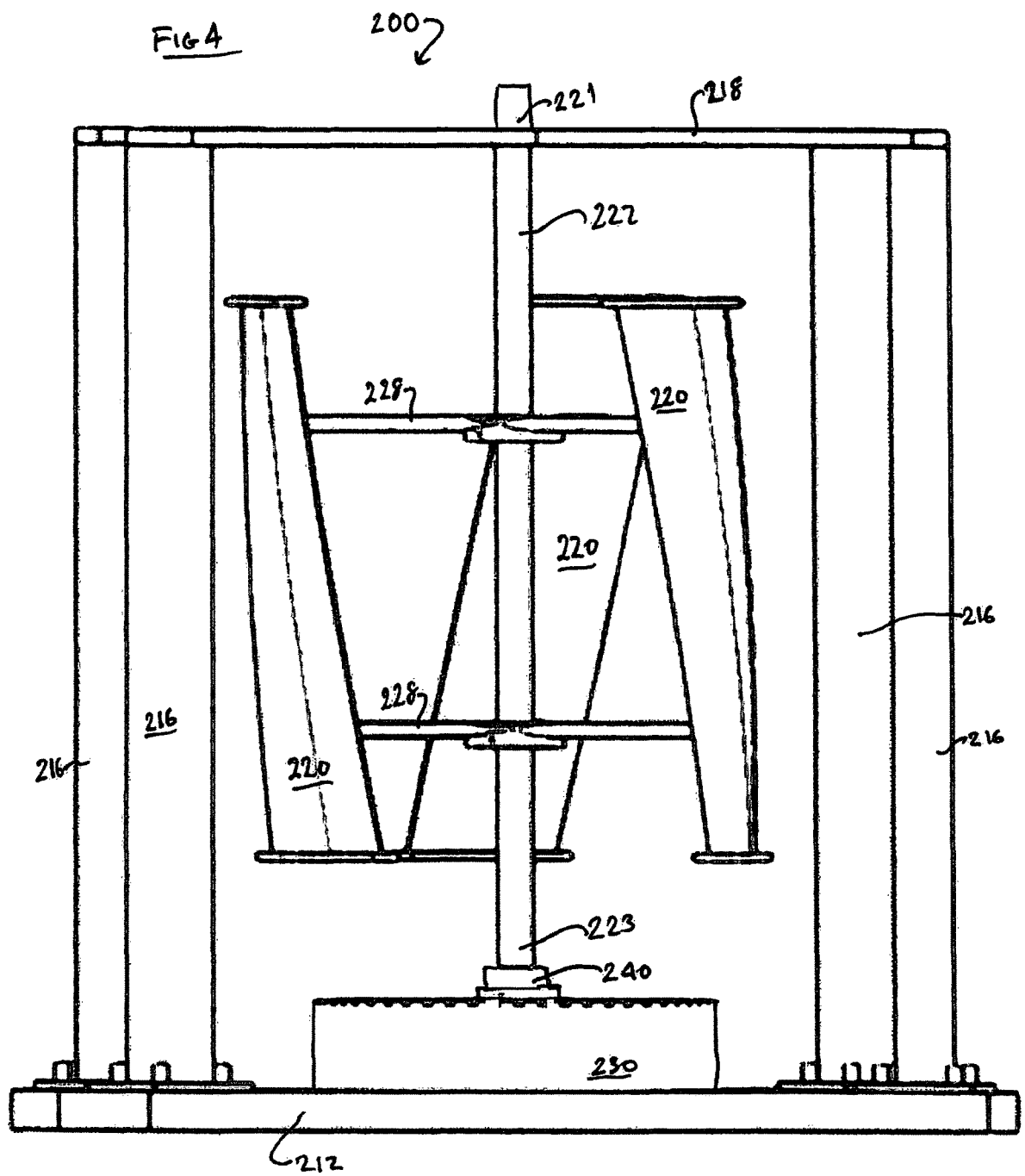
FIG. 4 shows a side view of the turbine shown in FIG. 3.
Figure 5:
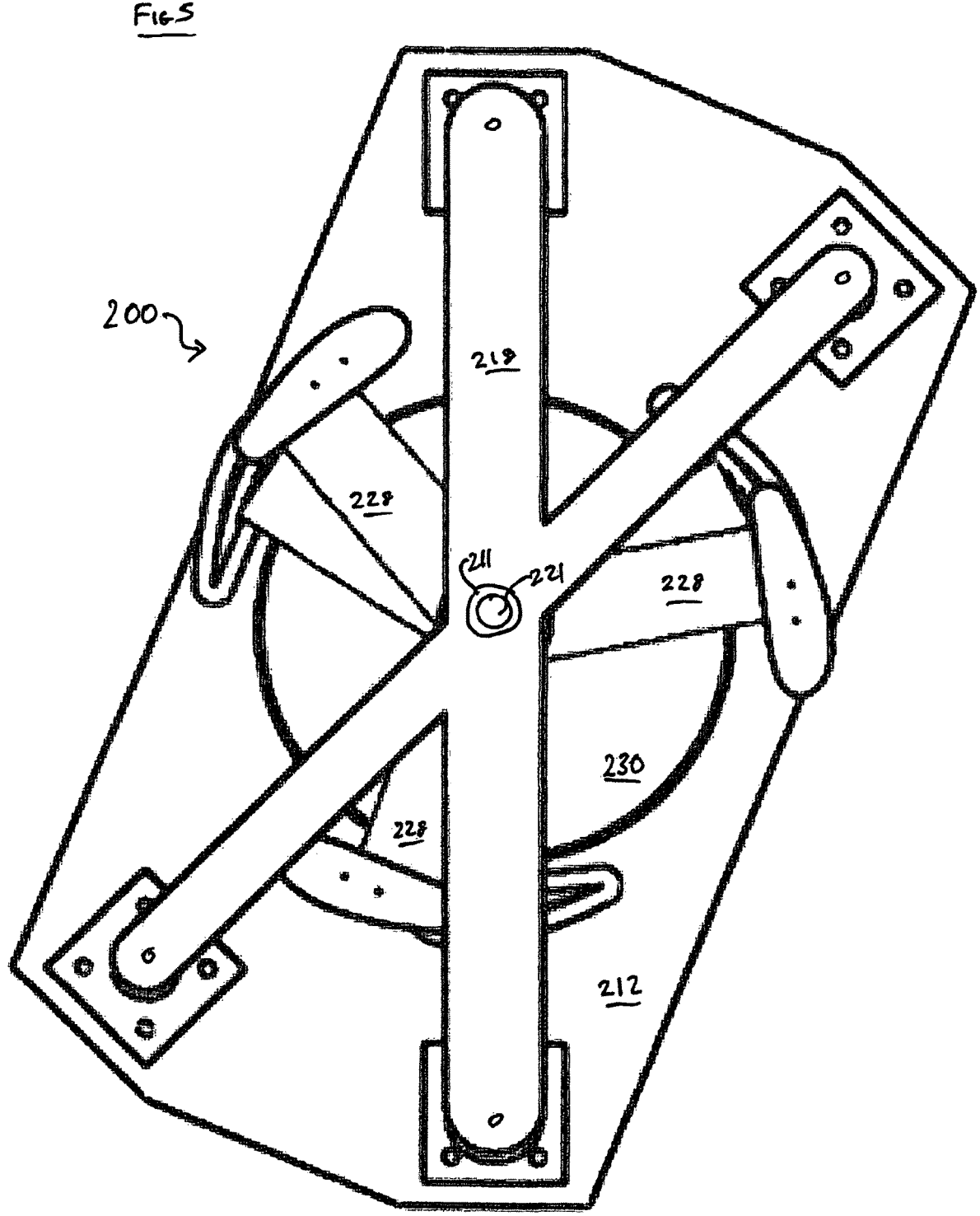
FIG. 5 shows a plan view of the turbine shown in FIG. 3.

FIGS. 4 and 5 show additional views of the embodiment shown in FIG. 3. A torque transmitting coupling 240 is used, which has the same construction and function as the coupling 140 described above and illustrated in FIG. 2.

Figure 6:
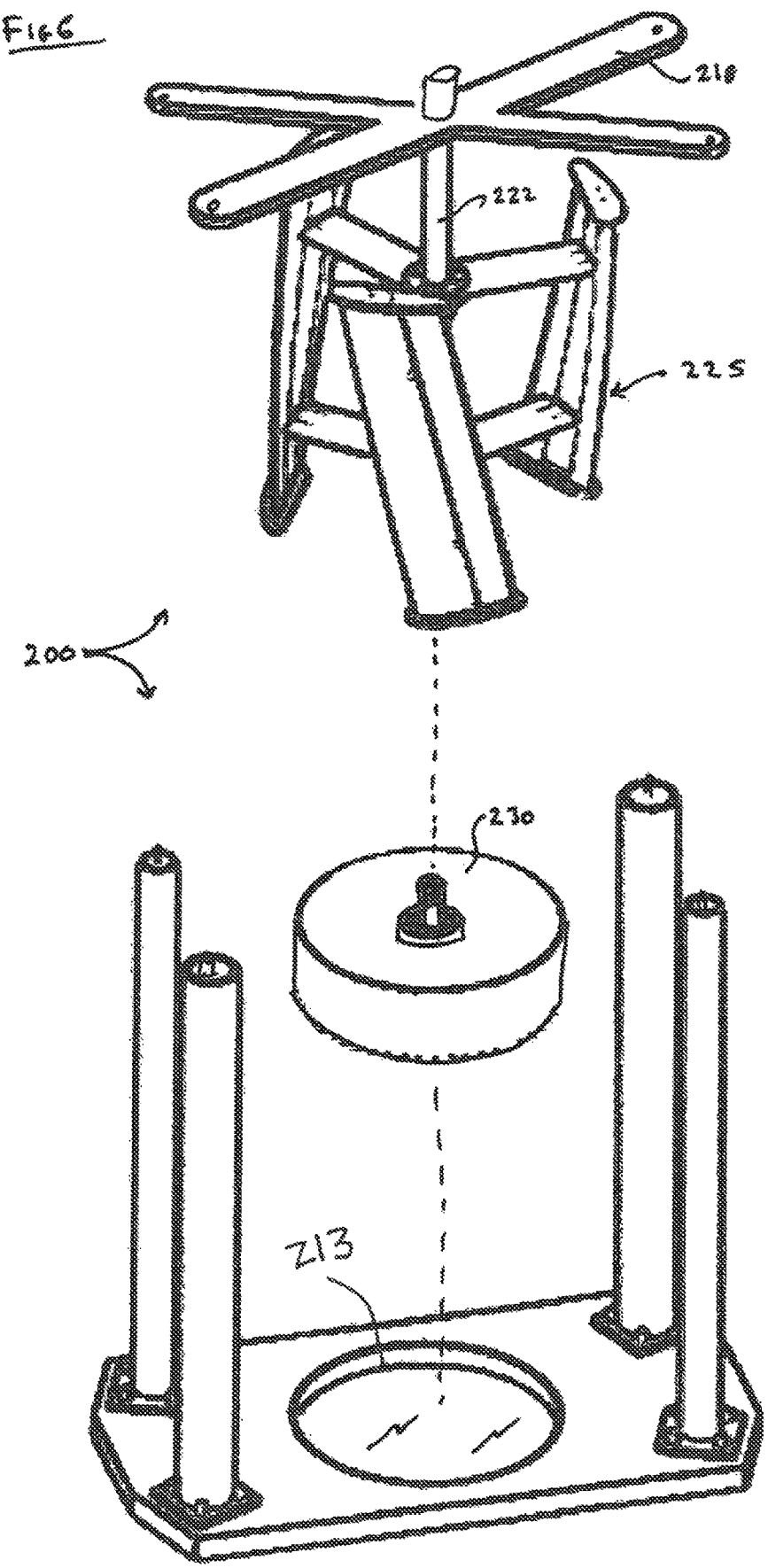
FIG. 6 shows an exploded view of the turbine shown in FIG. 3.

FIG. 6 shows an exploded view of the turbine 200, and illustrates that the cross brace 218, drive shaft 222 and blade set 225 can be removed for maintenance as one assembly, and can be readily separated from the remaining parts of the turbine, including the generator 230, as described above. The generator 230, in this case sits in a recess 213 in the base 212, for ease of assembly, for example when under water.

Figure 7:
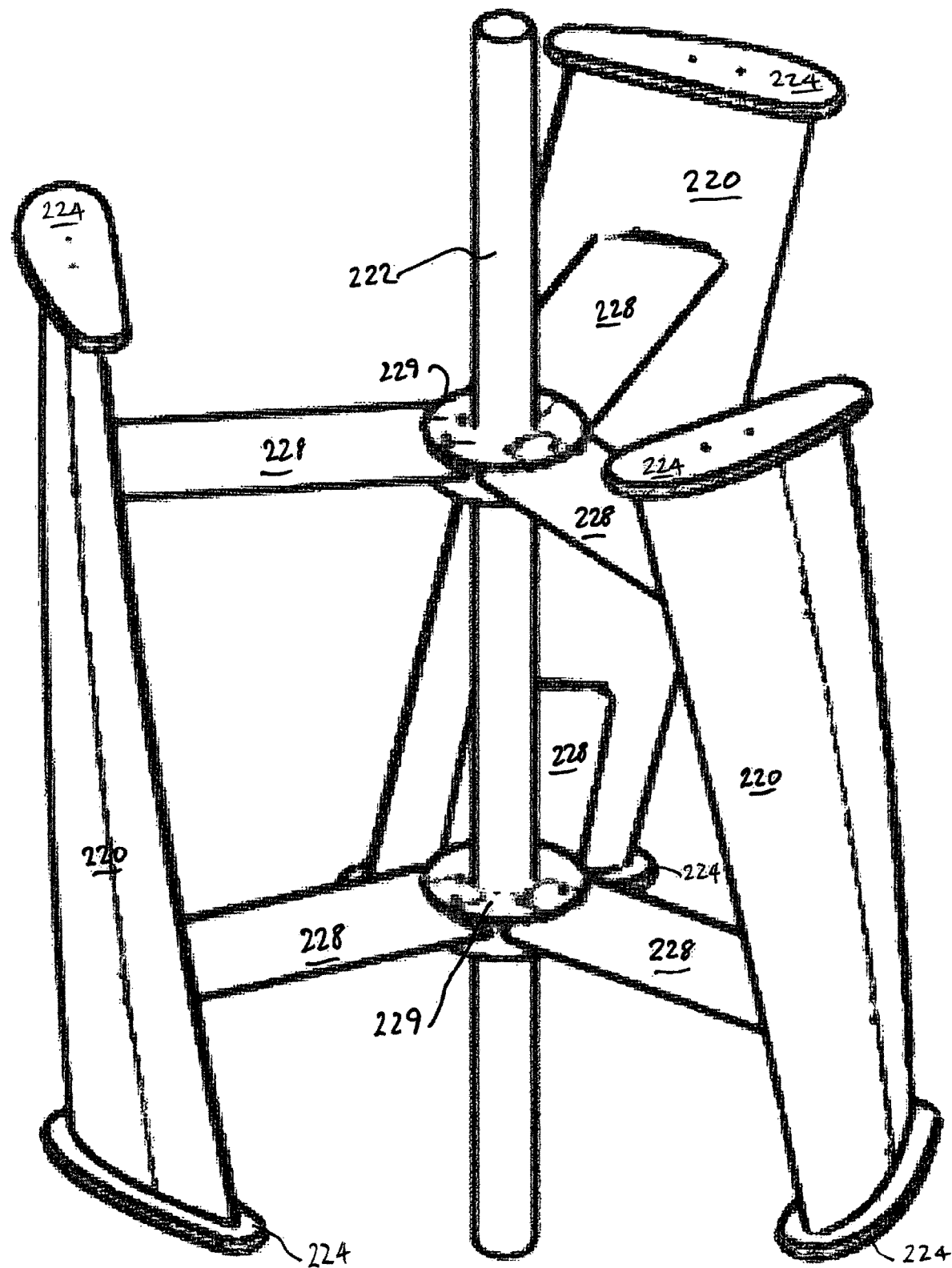
FIG. 7 shows details of the turbine shown in FIG. 3.

FIG. 7 shows the blade assembly 225 mounted to the drive shaft 222. The spokes 228 which support the blades 220 are each mounted one of two spaced bosses 229, in turn mounted to the shaft 222. The spokes have an aerofoil profile to reduce drag. Each end of each blade 220 is terminated by an enlarged tip, in this case, in the form of winglet 224, which is generally flat with an aerofoil profile. These winglets 224 improve the efficiency of the helical blades still further by inhibiting water flowing over the blades to spill over their ends.

Although two embodiments have been described and illustrated, additions, omissions and modifications are possible to those embodiments without departing from the scope of the invention claimed. For example, in the two embodiments, four legs 116/216 have been illustrated. Although this arrangement is preferred, to provide a generally open structure through which water can flow omnidirectionally, other numbers of legs can be employed, for example, 3 or 6 legs could be used.

A heavy base member 112/212 is preferred, but may be replaced with a lighter base member where the base can be securely anchored to the bed of the volume of water in which the turbine 100/200 rests. The rotary machine 130/230 disposed below the blade assembly 125/225, increases the effective weight of the base and so increases the stabilising effect of the base. To increase weight further, the rotary machine may include a gearbox to increase the rotational speed of the drive. It is preferred that the gearbox be incorporated into the housing 132 of the rotary machine such that the coupling 140/240 is between the shaft 122 and the gearbox. A turbine brake can be incorporated into the rotary machine, for example at the gearbox.

A cross brace 118/218 is shown which connects together all the legs illustrated. This arrangement is preferred for rigidity, but the cross brace could have another shape besides an X shape, for example, the cross brace could be an annular ring or rectilinear frame connecting each leg, and may include one or more members extending diametrically across the ring or frame, to support the shaft 122/222.

The overall arrangement of the blade assemblies 125 and 225 mounted on a shaft 122 and 222 respectively, about a central rotational axis (C in FIGS. 1 and 3), with support legs 116 and 216 located wholly or substantially outside the swept volume of the blade assemblies defining an open superstructure. This arrangement means that no central support, for example within the shaft, is 30 required. This simplifies construction and maintenance procedures, because assembly and disassembly are much easier. Also, this arrangement makes the turbine more rigid and therefore it can be made lighter. This in turn means that smaller equipment can be used to install and maintain the turbine. In addition, for the turbine 100, the legs 116, can be positioned (as shown in FIG. 1) in the expected flow (A,B FIG. 1) such that they perturb water flow at the point where maximum torque would otherwise have been developed for a blade 120. Whilst some efficiency is lost as a result, the turbine 100 develops less vibration during rotation, which extends turbine life. The turbine 200, having helically formed blades 220, develops lees vibration in use and so the legs 216 have been spaced so that they are outside the expected water flow path (A,B FIG. 3). Although the legs 116 and 216 have been illustrated in an arrangement which is generally equidistant and symmetrical about the rotational axis of the turbine, it is possible that the legs are not all so arranged. For example one or more legs may be closer to the rotational axis than others. In that case the legs closer to the axis can interrupt water flow to one side of the axis, where unidirectional flow is encountered in order to perturb flow on one side only in the path of the turbine elements, and thereby reducing the drag of a blade turbine element as moves in the direction of the flow, or reducing the drag of a vane turbine element as it moves into the flow.

Although rotary machines in the form of electrical generators 130/230 have been described above and illustrated, other rotary machines could be employed to turn the rotational power from the blade set into other energy or potential energy. For example, a dynamo could be used to generate electricity or a pump could be used to compress ambient water or air from a surface supply. For efficiency, blades are preferred, i.e. turbine elements which generate lift in a similar manner to an aeroplane wing, when fluid flows across them. However vanes could be used as turbine elements, which are pushed by water flow in the same way as a conventional paddled undershot water wheel.

The embodiments provide a simple, low cost, reliable, easy to maintain turbine which can be deployed in the adverse conditions encountered in near-shore sea beds including sea beds which are exposed or have shallow water at low tides, in deeper sea beds where currents exist, and in inland waterways. Given the generally cuboid outside dimensions of the turbine constructions illustrated, it is possible to arrange plural similar turbines in a row or in a two or three dimensional array, for increased energy output. Such plural turbines can be bolted together or may have other complementary connecting means, such as hooked parts and hook receiving parts.

The invention claimed is:

1. A water turbine arrangement for capturing energy from a water flow, the arrangement comprising:
   a base member having a recess;
   a support structure mounted to the base and upstanding therefrom, the support structure including plural legs secured to the base and extending continuously to and joined by a brace at or adjacent upper ends of the plural legs;
   shaft mounted turbine elements mounted for rotation about a shaft to define a swept volume, said plural legs being positioned outside the swept volume and said shaft being supported at an upper end of said shaft by the brace; and
   a rotary machine mounted to the base within the recess for converting rotational energy of the shaft into other energy, wherein the rotary machine is coupled to the shaft and has a rotational axis coaxial with an axis of rotation of the shaft, wherein the rotary machine is housed in a fluid sealed or hermetically sealed housing, and wherein a coupling between a lower end of the shaft and the rotary machine provides a torque transmitting relationship which transmits torque through the housing by a magnetic attraction, wherein the brace is demountable from the plural legs such that the brace and the shaft mounted turbine elements are separable from the rotary machine and the plural legs which remain secured to the base.

2. The turbine arrangement as claimed in claim 1, wherein the coupling includes complementary magnets or magnetic elements on both the lower end of the shaft and on a driven part of the rotary machine, which magnets/magnetic elements are attracted to each other on either side of the housing to provide said torque transmitting relationship.

3. The turbine arrangement as claimed in claim 1 further comprising a top bearing and a bottom bearing disposed about the shaft, wherein the turbine arrangement is rotationally supported substantially between the top and bottom bearings.

4. The turbine arrangement as claimed in claim 3, wherein the top bearing is mounted to the brace, and wherein the bottom bearing is mounted to the housing, and thereby acts to hold the lower end of the shaft in alignment with a driven part of the rotary machine.

5. The turbine arrangement as claimed in claim 1, wherein the plural legs are disposed with the same radial distance from the shaft.

6. The turbine arrangement as claimed in claim 1, wherein the turbine arrangement has a swept area when viewed in a direction of intended flow path toward the turbine arrangement, and the plural legs are positioned on the base outside a flow path area such that the plural legs do not perturb the flow in the flow path area.

7. The turbine arrangement as claimed in claim 1, wherein the rotary machine is demountable from the base.

8. The turbine arrangement as claimed in claim 1, wherein the rotary machine is an electrical energy generator, having a rotor coupled to the turbine arrangement.

9. The turbine arrangement as claimed in claim 1, wherein said turbine elements are blades providing lift at a constant effective radius of rotation along a length of the blades.

10. A water flow turbine arrangement comprising a base and an open superstructure supporting a rotatable cross-axis water flow turbine, the superstructure comprising separable upper and lower parts which are disconnectable such that the upper parts and the turbine can be removed from a remainder of the turbine arrangement in one piece, the arrangement optionally including the features of claim 1.

11. The turbine arrangement as claimed in claim 10, wherein the turbine is coupled by a rotational bearing to the upper parts at an upper end of the turbine, and a lower end of the turbine includes a magnetic coupling which is disconnectable from a rotary machine of the remainder of the turbine arrangement.

12. A water flow turbine arrangement comprising a rotatable cross-axis water flow turbine supported at or adjacent one end on an open superstructure, and coupled at an opposite end to a sealed rotary machine by a magnetic coupling which coupling provides a torque transmitting relationship between the turbine and driven elements of the rotary machine, the arrangement optionally including the features of claim 1.

13. A water turbine arrangement for capturing energy from a water flow, the arrangement comprising:
   a base member;
   a support structure mounted to the base and upstanding therefrom, the support structure including continuous plural legs fixed to the base at lower ends of the plural legs and joined by a removable X-shaped cross brace at or adjacent upper ends of the plural legs;

shaft mounted turbine elements mounted for rotation about a shaft to define a swept volume, said plural legs being positioned outside the swept volume and said shaft being supported at an upper end of said shaft by the brace; and a machine mounted to the base for converting rotational energy of the shaft into other energy, wherein the turbine arrangement has a swept area when viewed in a direction of intended flow path toward the turbine arrangement, and at least one of the plural legs at least partially projects into a flow path area such that said at least one of the plural legs perturbs a portion of the flow in the flow path area.

\* \* \* \* \*